US007609248B2

(12) United States Patent
Hong et al.

(10) Patent No.: US 7,609,248 B2

(45) Date of Patent: Oct. 27, 2009

(54) APPARATUS AND METHOD FOR LUMINANCE CONTROL OF LIQUID CRYSTAL DISPLAY DEVICE

(75) Inventors: Hee Jung Hong, Seoul (KR); Kyung Joon Kwon, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 841 days.

(21) Appl. No.: 11/149,876

(22) Filed: Jun. 10, 2005

(65) Prior Publication Data

US 2006/0109234 A1 May 25, 2006

(30) Foreign Application Priority Data

Nov. 25, 2004 (KR) ........................ 10-2004-097696

(51) Int. Cl.
*G09G 3/36* (2006.01)
*G02F 1/1335* (2006.01)

(52) U.S. Cl. ........................... 345/102; 349/61; 349/62; 349/63; 349/64; 349/65; 349/66; 349/67; 349/68; 349/69; 349/70; 349/71

(58) Field of Classification Search ................. 345/102; 349/61–71
See application file for complete search history.

(56) References Cited

U.S. PATENT DOCUMENTS

2002/0003522 A1 * 1/2002 Baba et al. .................... 345/89
2002/0057238 A1 * 5/2002 Nitta et al. .................... 345/87
2004/0125062 A1 * 7/2004 Yamamoto et al. ............ 345/87

FOREIGN PATENT DOCUMENTS

JP 10-162988 6/1998
JP 2002-099250 4/2002
KR 1020020057407 A * 11/2002

OTHER PUBLICATIONS

Office Action issued in corresponding Japanese Patent Application No. 2005-187723; issued Feb. 16, 2009.

* cited by examiner

*Primary Examiner*—Richard Hjerpe
*Assistant Examiner*—Alexander S. Beck
(74) *Attorney, Agent, or Firm*—Brinks Hofer Gilson & Lione

(57) ABSTRACT

A luminance control apparatus of a liquid crystal display device (LCD) is presented. The LCD includes a liquid crystal display panel divided into areas, lamps, an arithmetic unit, and a lamp driver. Fewer lamps are present than the number of areas. The arithmetic unit scans pixels of each area, extracts a peak value of the gray level of pixels of the area, and calculates a maximum peak brightness value and an average value of the area. The lamp driver controls the brightness of the lamps in accordance with the average value and the maximum peak brightness value.

19 Claims, 14 Drawing Sheets

APPARATUS AND METHOD FOR LUMINANCE CONTROL OF LIQUID CRYSTAL DISPLAY DEVICE

This application claims the benefit of the Korean Patent Application No. P2004-97696 filed on Nov. 25, 2004, which is hereby incorporated by reference.

FIELD OF THE INVENTION

The present invention relates to a luminance control apparatus of a liquid crystal display device and a method thereof.

DESCRIPTION OF THE RELATED ART

Generally, a liquid crystal display (hereinafter, referred to as "LCD") device is being using in an increasing number of applications due its light weight, thinness, low power consumption and so on. These applications include office automation equipment, audio/video equipment and so on. The LCD controls the transmissivity of a light beam in accordance with a video signal applied to a plurality of control switches, which are arranged in a matrix, thereby displaying a desired picture on a screen.

In this way, the LCD requires a light source such as a backlight because it is not a self-luminous display device. The backlights using in LCDs include direct type backlights and light guide type backlights. In the direct type backlight, several lamps are arranged in a plane and a diffusion panel is installed between the lamps and the liquid crystal display panel to maintain the distance between the liquid crystal display panel and the lamps. In the light guide type backlight, the lamp is installed in the outer part of the flat panel and light is incident to the whole surface of the liquid crystal display panel by use of a transparent light guide panel.

Referring to FIGS. 1 and 2, the LCD using a direct type backlight of the prior art includes a liquid crystal display panel 2 to display a picture, and a direct type backlight unit to irradiate uniform light onto the liquid crystal display panel 2.

The liquid crystal display panel 2 has liquid crystal cells arranged between an upper substrate and a lower substrate in an active matrix shape, and a common electrode and pixel electrodes to apply electric field to each of the liquid crystal cells are provided. Conventionally, the pixel electrode is formed on the lower substrate, i.e., a thin film transistor substrate, by liquid crystal cells, but on the other hand, the common electrode is formed to be integrated with the upper substrate on the front surface thereof. Each of the pixel electrodes is connected to a thin film transistor that is used as a switch. The pixel electrode drives the liquid crystal cell along with the common electrode in accordance with a data signal supplied through the thin film transistor, thereby displaying a picture corresponding to a video signal.

The direct type backlight unit includes a plurality of lamps 36 to generate light; a lamp housing (or, a lamp holding container of the direct type backlight unit) 34 located at the lower part of the lamps 36, a diffusion plate 12 covering the lamp housing 34, and optical sheets 10 located on the diffusion plate 12.

Each of the lamps 36 is composed of a glass tube, an inert gas in the inside of the glass tube, and a cathode and an anode installed at both ends of the glass tube. The inside of the glass tube is charged with the inert gas, and phosphorus is spread over the inner wall of the glass tube.

In each of the lamps 36, if an AC waveform of high voltage is applied to a high voltage electrode and a low voltage electrode from an inverter (not shown), electrons are emitted from the low voltage electrode to collide with the inert gas of the inside of the glass tube, thus the amount of electrons are increased in geometrical progression. The increased electrons cause electric current to flow in the inside of the glass tube, so that the inert gas is excited by the electrons to emit ultraviolet radiation. The ultraviolet radiation collides with phosphorus spread over the inner wall of the glass tube to emit visible radiation. The AC waveform of high voltage is continuously supplied to the lamps 36 so that the lamps are always on.

In this way, the lamps 36 are arranged in parallel on the lamp housing 34, The lamps 36 are arranged on the lamp housing 34 in the same manner as the high voltage electrode and the low voltage electrode.

The lamp housing 34 prevents light leakage of the visible radiation emitted from the lamps 36 and reflects the visible radiation progressing to the side surface and the rear surface of the lamps 36 to the front surface, i.e., toward the diffusion plate 12, thereby improving the efficiency of the light generated at the lamps 36.

The diffusion plate 12 enables the light emitted from the lamps 36 to progress toward the liquid crystal display panel 2 and to be incident in a wide range of angles. The diffusion plate 12 is a light diffusion member coated on both sides of a transparent resin film.

The optical sheets 10 make the viewing angle of the light coming out of the diffusion plate 12 narrow, thus it is possible that the front brightness of the liquid crystal display device is improved and its power consumption is reduced.

A reflection sheet 14 is arranged between the lamps 36 and the upper surface of the lamp housing 34 to reflect the light generated from the lamps 36 so as to irradiate it in a liquid crystal display panel 2 direction, thereby improving the efficiency of light.

In this way, the LCD of the prior art generates a uniform light by use of the lamps 36 arranged in the lamp housing 34 to irradiate it on the liquid crystal display panel 2, thereby displaying the desired picture. However, the lamps in the LCD of the prior art are on continuously, increasing the power consumption and not permitting a peak brightness to be realized. The peak brightness is used when a designated part on the liquid crystal display panel 2 is instantly brightened in order to display a picture like an explosion or a flash on the liquid crystal display panel 2.

SUMMARY OF THE INVENTION

By way of introduction, a luminance control apparatus of a liquid crystal display device according to an aspect of the present invention includes a liquid crystal display panel divided into a first number of division areas; a plurality of lamps divided into and driven using a second number of areas which is smaller than the first number of division areas; an arithmetic unit that scans video pixels of each area of the liquid crystal display panel, extracts a peak value of the gray level of each pixel of the division area, and calculates a maximum peak brightness value and an average value of the division area; and a lamp driver that controls the brightness of the lamps in accordance with the average value and the maximum peak brightness value.

In another embodiment, a luminance control method of a liquid crystal display device comprises: irradiating a liquid crystal display panel having a first number of division areas with light from a plurality of lamps dividedly driven into a second number which is smaller than the first number; calculating a maximum peak brightness value and an average peak value of each of video pixels generated by designated areas of the liquid crystal display panel by use of an arithmetic unit; re-arranging a division area of the liquid crystal display panel to correspond to each of lamp division areas; and controlling a plurality of lamps to irradiate the liquid crystal display panel with light in accordance with the maximum peak brightness value and the average peak value.

In another embodiment, a luminance control apparatus comprises a display panel having a plurality of pixels, the pixels divided into sets of pixels; a plurality of lamps supplying light to the display panel, each set of pixels associated with a lamp; and a control circuit that, for each set of pixels, determines a plurality of characteristics including at least two of: a peak value of a gray level of each pixel in the set of pixels, a maximum peak value of the gray levels in the set of pixels, an average peak value of the gray levels in the set of pixels and an average value of the gray levels in the set of pixels, and controls the lamp associated with the set of pixels dependent on the plurality of characteristics.

BRIEF DESCRIPTION OF THE DRAWINGS

The invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 3 to 12.

Figure 1:
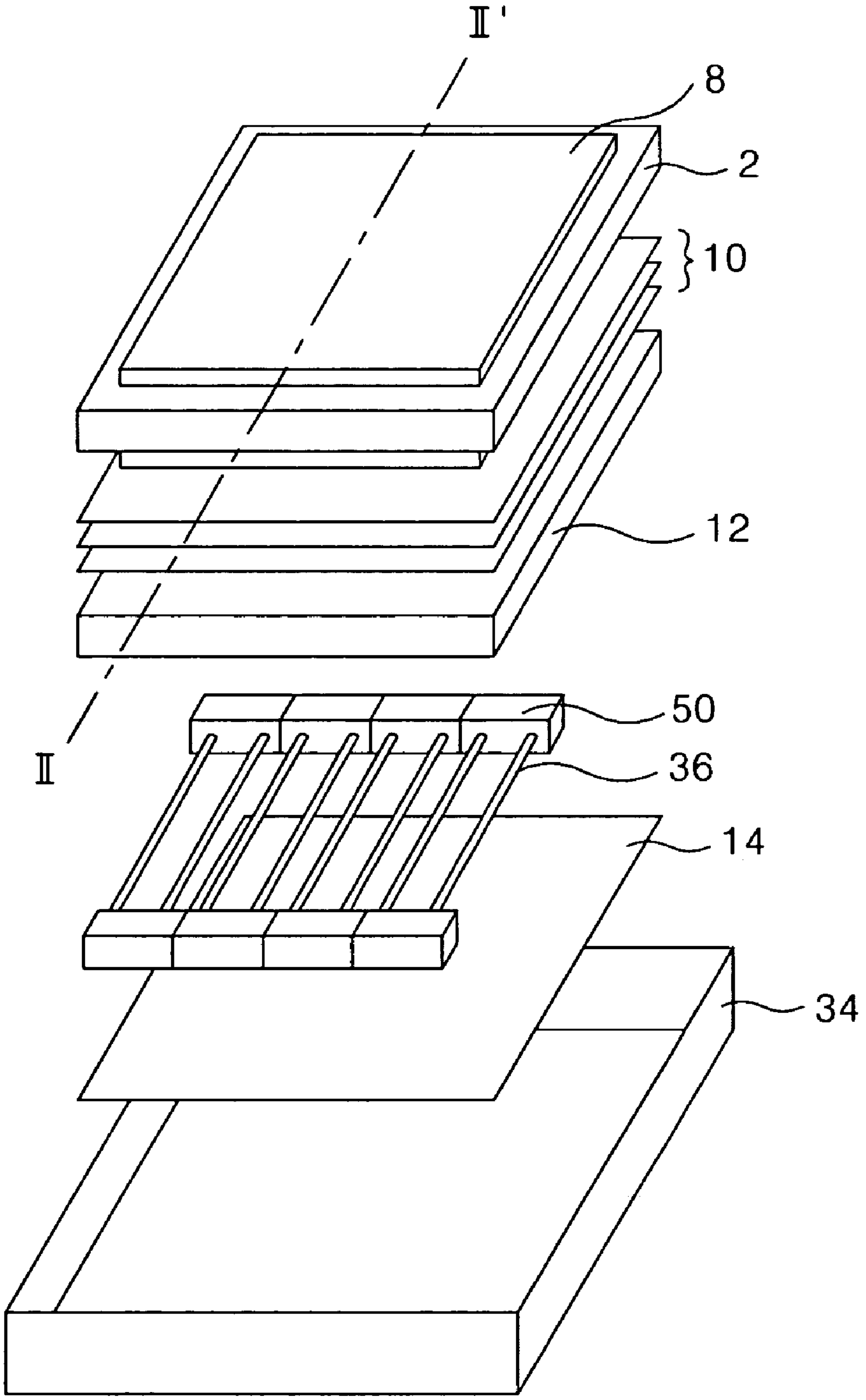
FIG. 1 RELATED ART
FIG. 1 is a diagram representing a liquid crystal display device of the prior art.
Figure 2:
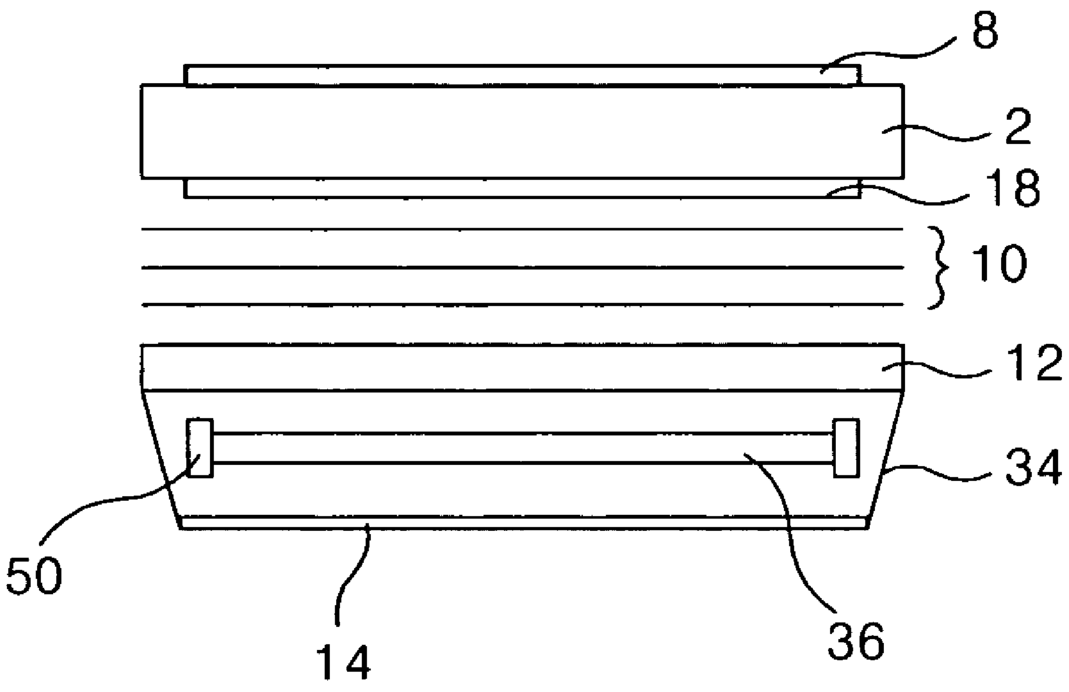
FIG. 2 RELATED ART
FIG. 2 is a diagram representing a section made by cutting along the line II-II' of FIG. 1.
Figure 3:
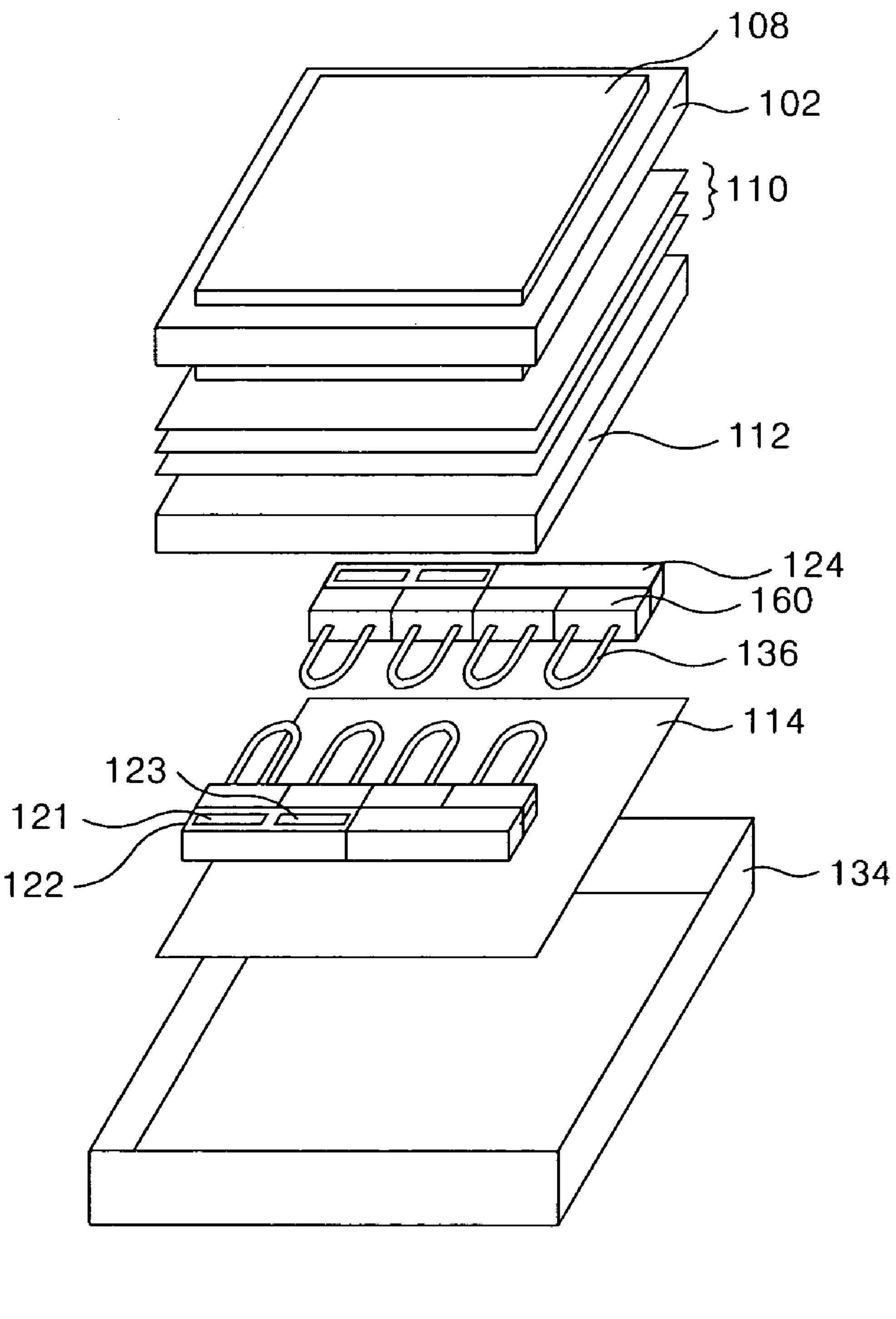
FIG. 3 is a diagram representing a liquid crystal display device according to an embodiment of the present invention.

FIG. 3 is a diagram representing a liquid crystal display device according to a first embodiment of the present invention.

Referring to FIG. 3, a liquid crystal display device according to a first embodiment of the present invention includes a liquid crystal display panel 102 to realize a picture; a backlight unit having a plurality of lamps 136 which irradiate designated areas of the liquid crystal display panel 102 with light; an arithmetic unit 122 to scan a pixel value of the designated area of the liquid crystal display panel 102 and to process it; a lookup table 124 to map the result value of the arithmetic unit 122 to a control signal corresponding to a video signal; and a lamp driver 160 to drive a plurality of lamps 136 in accordance with the control signal.

The liquid crystal display panel 102 has liquid crystal cells arranged between an upper substrate and a lower substrate in an active matrix. A common electrode and pixel electrodes to apply an electric field to each of the liquid crystal cells are formed on the substrates. The pixel electrodes are formed on the lower substrate, i.e., a thin film transistor substrate, while the common electrode is formed to be integrated with the upper substrate on the front surface thereof. Each of the pixel electrodes is connected to a thin film transistor that is used as a switch. The pixel electrode drives the liquid crystal cell along with the common electrode in accordance with a data signal supplied through the thin film transistor, thereby displaying a picture corresponding to a video signal.

The backlight unit includes a plurality of lamps 136 to generate light; a lamp housing 134 holding the lamps 136; a diffusion plate 112 to diffuse the light generated from the lamp housing 134; and optical sheets 110 to increase the efficiency of the light coming out of the diffusion plate 112.

Each of the lamps 136 is composed of a glass tube, an inert gas in the inside of the glass tube, and a cathode and an anode installed at both ends of the glass tube. The inside of the glass tube is charged with the inert gas, and phosphorus is spread over the inner wall of the glass tube. The lamps 136 are arranged on the lamp housing 134 in parallel.

The lamp housing 134 prevents light leakage of the visible radiation emitted from the lamps 136 and reflects the visible radiation progressing to the side surface and the rear surface of the lamps 136 to the front surface, i.e., toward the diffusion plate 112, thereby improving the efficiency of the light generated at the lamps 136.

The diffusion plate 112 enables the light emitted from the lamps 136 to progress toward the liquid crystal display panel 102 and to be incident in over a wide range of angles. The diffusion plate 112 is a light diffusion member coated on both sides of a transparent resin film.

Figure 4:
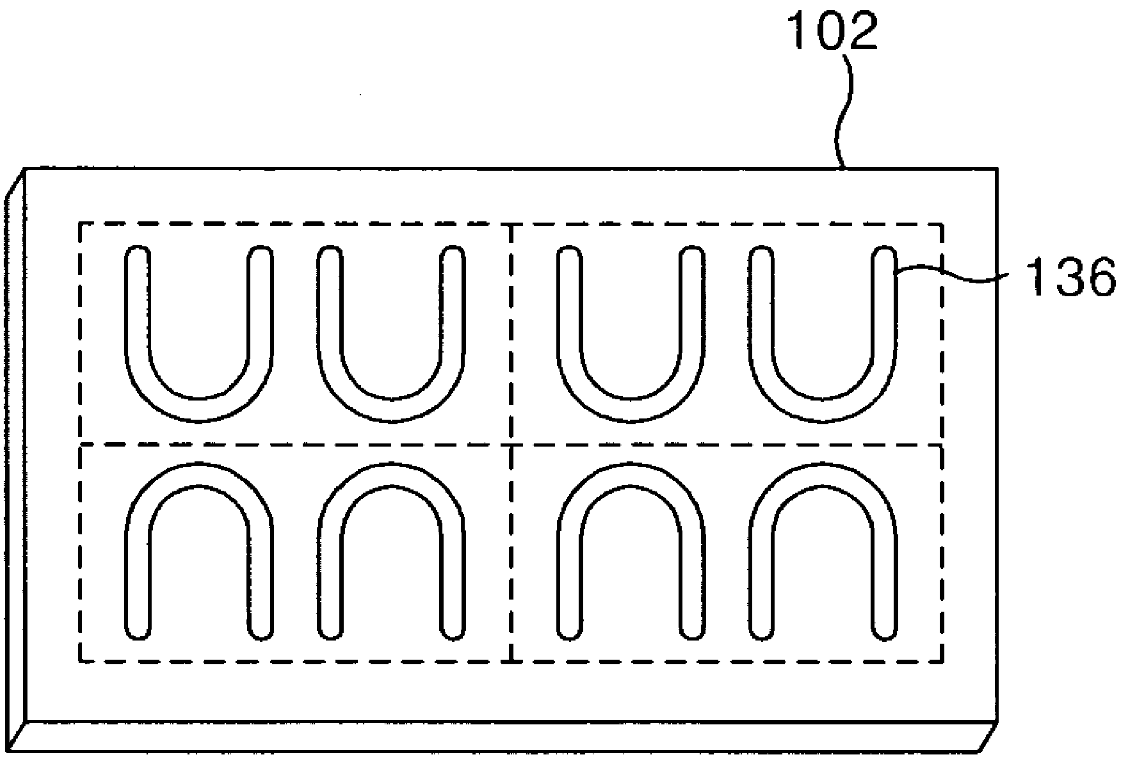
FIG. 4 is a diagram representing another type of lamp which is driven according to the embodiment of the present invention.

The lamps 136 according to the first embodiment of the present invention are formed in "U" shapes. The "U" shaped lamp is manufactured standing up on the upper surface of the diffusion plate 112 and are dividedly driven as shown in FIG. 4. The lamp can also have an "L" shape, linear shape or round shape. Accordingly, the liquid crystal display device according to the first embodiment of the present invention is not limited in its lamp shape.

The optical sheets 110 make the viewing angle of the light coming out of the diffusion plate 112 narrow, thus it is possible that the front brightness of the liquid crystal display device is improved and its power consumption is reduced.

A reflection sheet 114 is arranged between the lamps 136 and the upper surface of the lamp housing 134 to reflect the light generated from the lamps 136 so as to irradiate it in a liquid crystal display panel 102 direction, thereby improving the efficiency of light.

The arithmetic unit 122 scans each pixel value of the liquid crystal display panel 102, which is divided into designated areas, and the average value of the peak value of the pixel, i.e., red, green, blue RGB) is calculated. The average value of all the pixels of the designated area is then calculated. The arithmetic unit 122 includes a scan part 121 to detect the pixel value of each divided area, and a calculating part 123 to extract the peak value of the sub-pixels among the pixels detected from the scan part and to calculate the average value of the extracted peak values. As an example, a liquid crystal display panel 102 divided into four areas is shown in FIG. 5.

Figure 5:
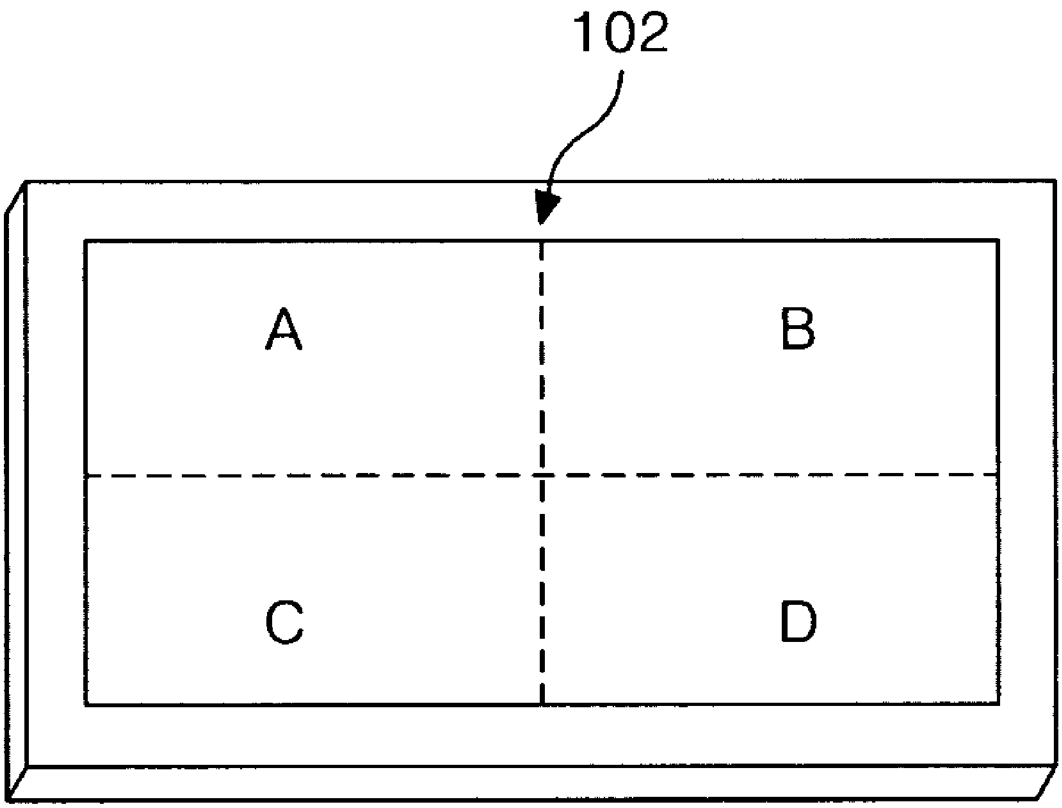
FIG. 5 is a diagram representing the drive of a liquid crystal display panel according to the embodiment of the present invention.

Referring to FIG. 5, it is assumed that the RGB values of the pixels displayed in an "A" area are measured as in the following Table 1.

TABLE 1

| | Pixel 1 | Pixel 2 | Pixel 3 | Pixel 4 | . . . | Pixel End |
|---|---|---|---|---|---|---|
| R(red) sub-pixel | 10 | 90 | 10 | 10 | . . . | 100 |
| G(green) sub-pixel | 30 | 30 | 50 | 200 | . . . | 20 |
| B(blue) sub-pixel | 60 | 10 | 60 | 60 | . . . | 60 |
| Peak Value | 60 | 90 | 60 | 200 | . . . | 100 |

Firstly, the peak value among the pixel values of the first pixel, i.e., the RGB values of the pixel 1, is selected. In the same way, the peak value among the RGB values of the pixel 2 is selected. In this way, the peak value among the RGB values of each the pixels is selected until the last pixel is reached. The selected peak values are added and divided by the number of the pixels, thereby calculating the average peak value of each pixel displayed in the "A" area. Thus in Table 1, the peak value of pixel 1 is 60, the peak value of pixel 2 is 90, and the peak value of the last pixel is 100. Herein, assuming that the total number of the pixels in the "A" area is 10 and the total of the peak values is 1000, the average peak value of the "A" area is 100.

The lookup table 124 makes the peak values of each of areas A, B, C, D, which are calculated by the arithmetic unit 122, correspond to the size of the data signal in order to control a lamp driver 160. The lookup table 124 may also be included in the inside of the arithmetic unit 122, and the value stored at the lookup table 124 may be changed in accordance with a user input or the video display used.

Figure 6:
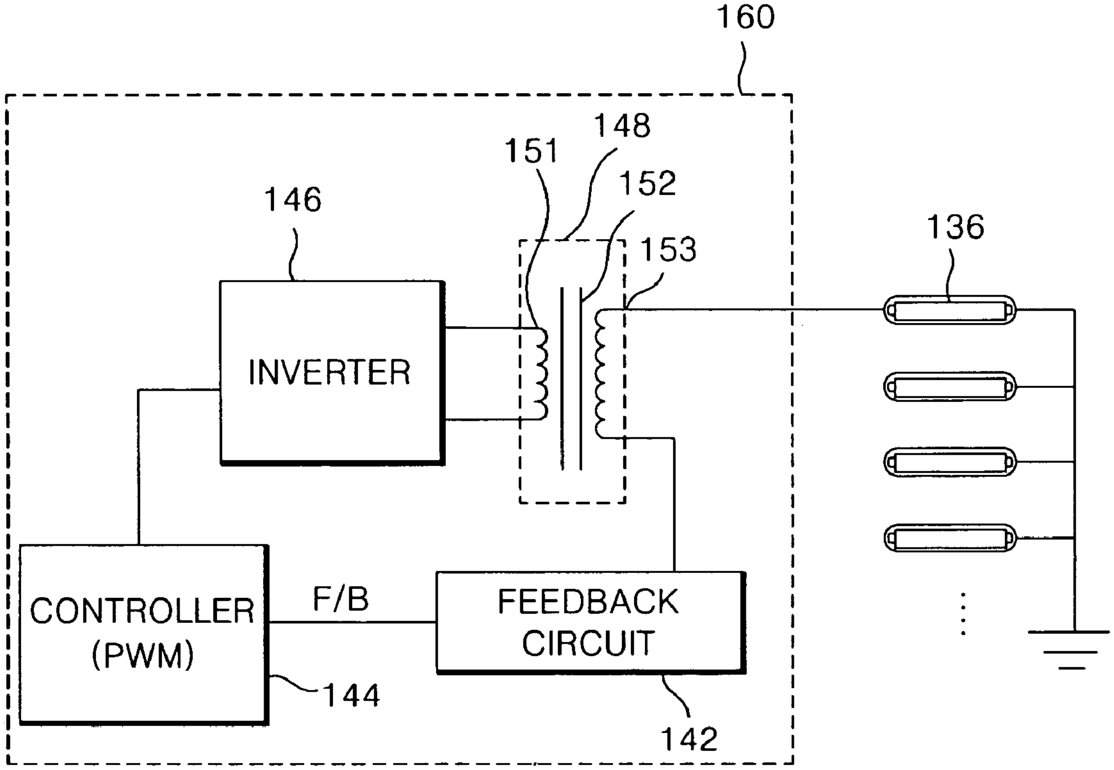
FIG. 6 is an enlarged diagram of a lamp driving apparatus of FIG. 5.

The lamp driver 160, as shown in FIG. 6, includes an inverter 146 to receive power from a power source (not shown) and to convert it into an AC waveform; a transformer 148 arranged between the inverter 146 and one end of the lamp 136 to boost the AC waveform generated from the inverter 146; a feedback circuit 142 arranged between the transformer 148 and one end of the lamp to inspect a tube current supplied from the transformer 148 to the lamp 136 and to generate a feedback signal accordingly; and a pulse width modulation (hereinafter, referred to as "PWM") controller 144 arranged between the inverter 146 and the feedback circuit 142 to receive the feedback signal and to generate a pulse signal that converts the AC waveform generated from the inverter 146.

The inverter 146 converts the voltage supplied from the voltage source into the AC waveform by use of a switch that is switched by the pulse generated from the PWM controller 144. The AC voltage formed in this way is transmitted to the transformer 148.

The transformer 148 boosts the AC waveform supplied from the inverter 146 to a high voltage AC waveform in order to drive the lamp 136. For this, a primary winding 151 of the transformer 148 is connected to the inverter 146, a secondary winding 153 is connected to the feedback circuit 142, and an auxiliary winding 152 is arranged therebetween. The auxiliary winding induces the voltage of the primary winding 151 to the secondary winding 153. An AC waveform supplied from the inverter 146 is boosted to the high voltage AC waveform to be induced to the secondary winding 153 of the transformer 148 dependent on the winding ratio between the primary winding 51 and the secondary winding 153. The high voltage waveform is supplied to one end of the lamp 136.

The feedback circuit 142 detects the current transmitted to the lamp 136 by the AC high voltage induced to the secondary winding 153 to generate a feedback voltage. The feedback circuit 142 may be located at the output stage of the lamp 136, thereby detecting the output value outputted from the lamp 136.

Figure 7:
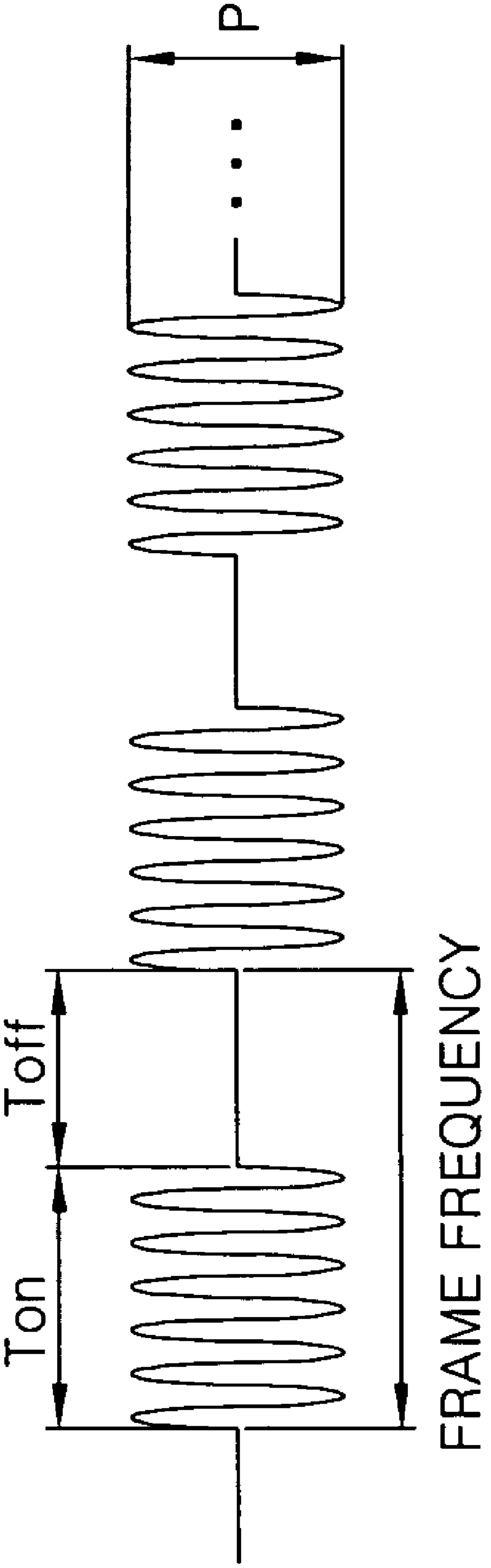
FIG. 7 is a diagram representing a waveform generated from a PWM controller according to a first embodiment of the present invention.

The PWM controller 144 receives the feedback of the tube current flowing in the lamp 136 to control the switching of the switch. Each of the PWM controllers 144 controls the switching of the switch of the inverter 146 to change the AC waveform. The AC waveform generated from the PWM controller 144 and transmitted to the inverter 146, as shown in FIG. 7, is divided into an on-time when a pulse is formed and an off-time when the pulse is not supplied.

A performing method of the luminance control apparatus of the liquid crystal display device having such a structure will be described referring to FIGS. 8 to 10.

Figure 8:
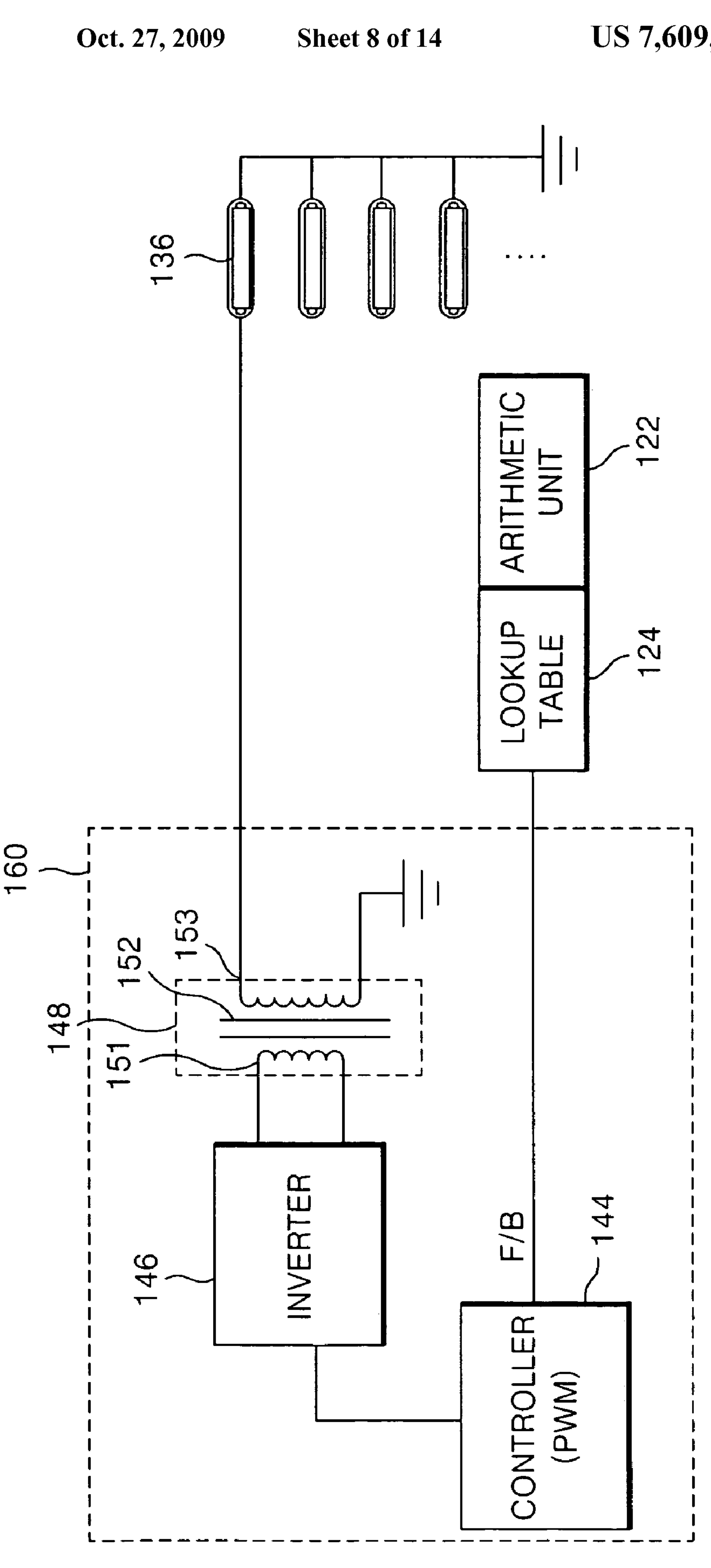
FIG. 8 is a diagram representing a luminance control apparatus according to the first embodiment of the present invention.
Figure 9A:
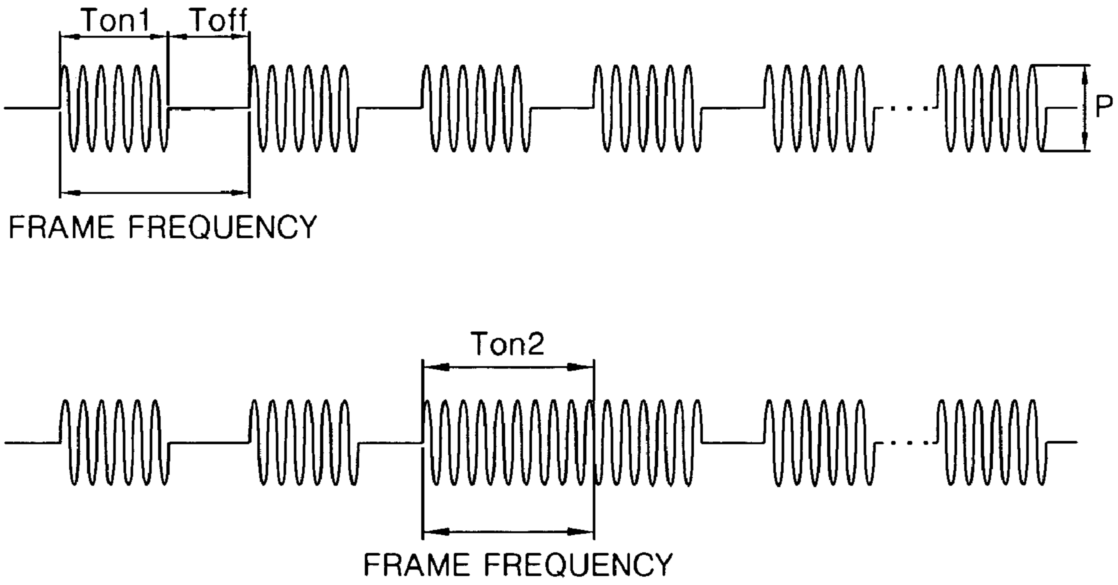
FIGS. 9A to 9C are diagrams representing another waveforms generated from the PWM controller according to the first embodiment of the present invention.
Figure 9B:
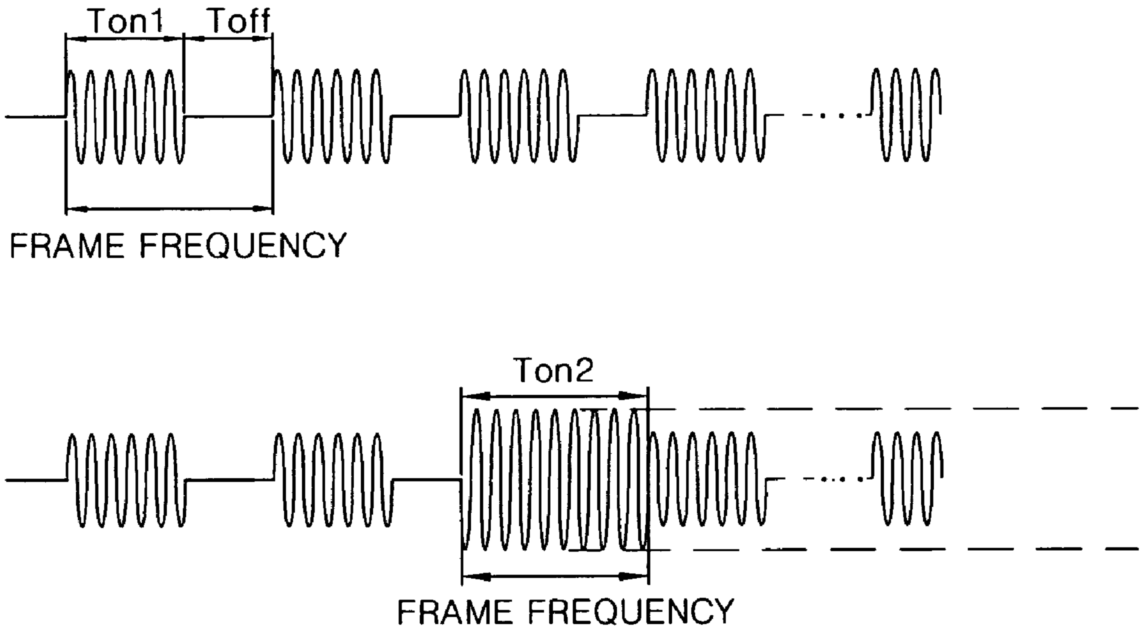
Figure 9C:
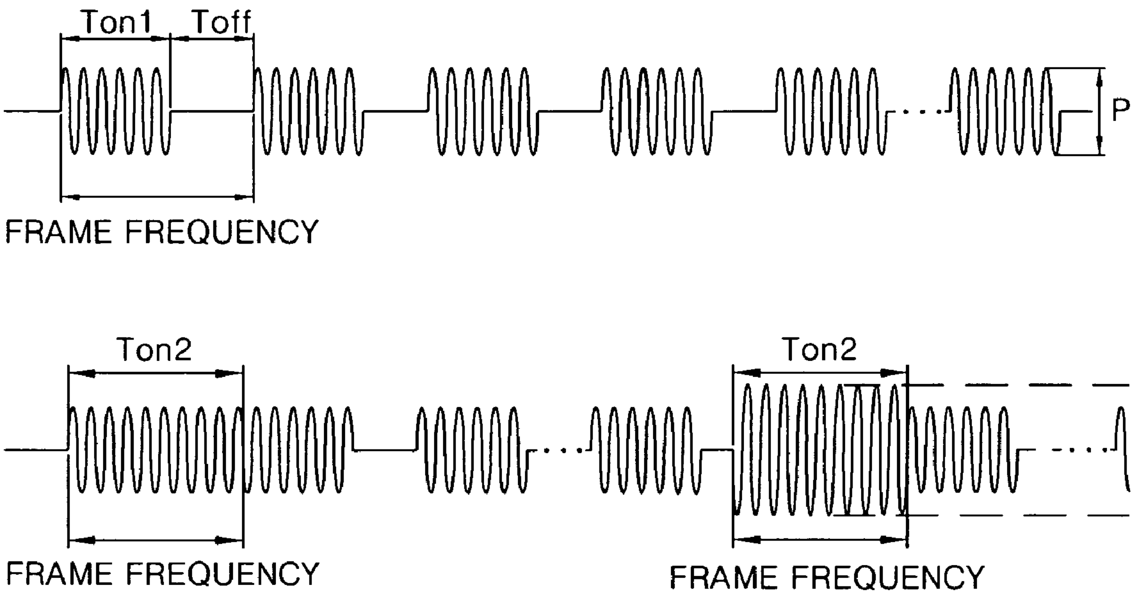

Firstly, referring to FIG. 8, the average peak value of the pixels displayed at each area A, B, C, D of the liquid crystal display panel 102 is calculated by the arithmetic unit 122. The average peak value calculated in this way is mapped with the lookup table 124 and changed to the control signal that is inputted to the PWM controller 144. The control signal is transmitted to the feedback circuit 142 and/or the PWM controller 144 that can control the tube current flowing in the lamp 136. The controller 144, feedback circuit 142 and PWM controller 144 are contained within control circuit 143. As the control signal is inputted to the PWM controller 144, the control signal, as shown in FIG. 9A, changes the duty ratio of the pulse generated from the PWM controller 144, or as shown in FIG. 9B, changes the amplitude of the pulse generated from the PWM controller 144, or as shown in FIG. 9C, changes the duty ratio of the pulse and the amplitude of the pulse generated from the PWM controller 144.

Alternatively, the feedback circuit 142 detecting the tube current supplied to the lamp 136 may be eliminated in order to minimize the size of the lamp driver 160. Accordingly, the pulse signal of the PWM controller 144 included in the lamp driver 160 may be changed by the arithmetic unit 122 and the lookup table 124, as shown in FIG. 10.

Figure 10:
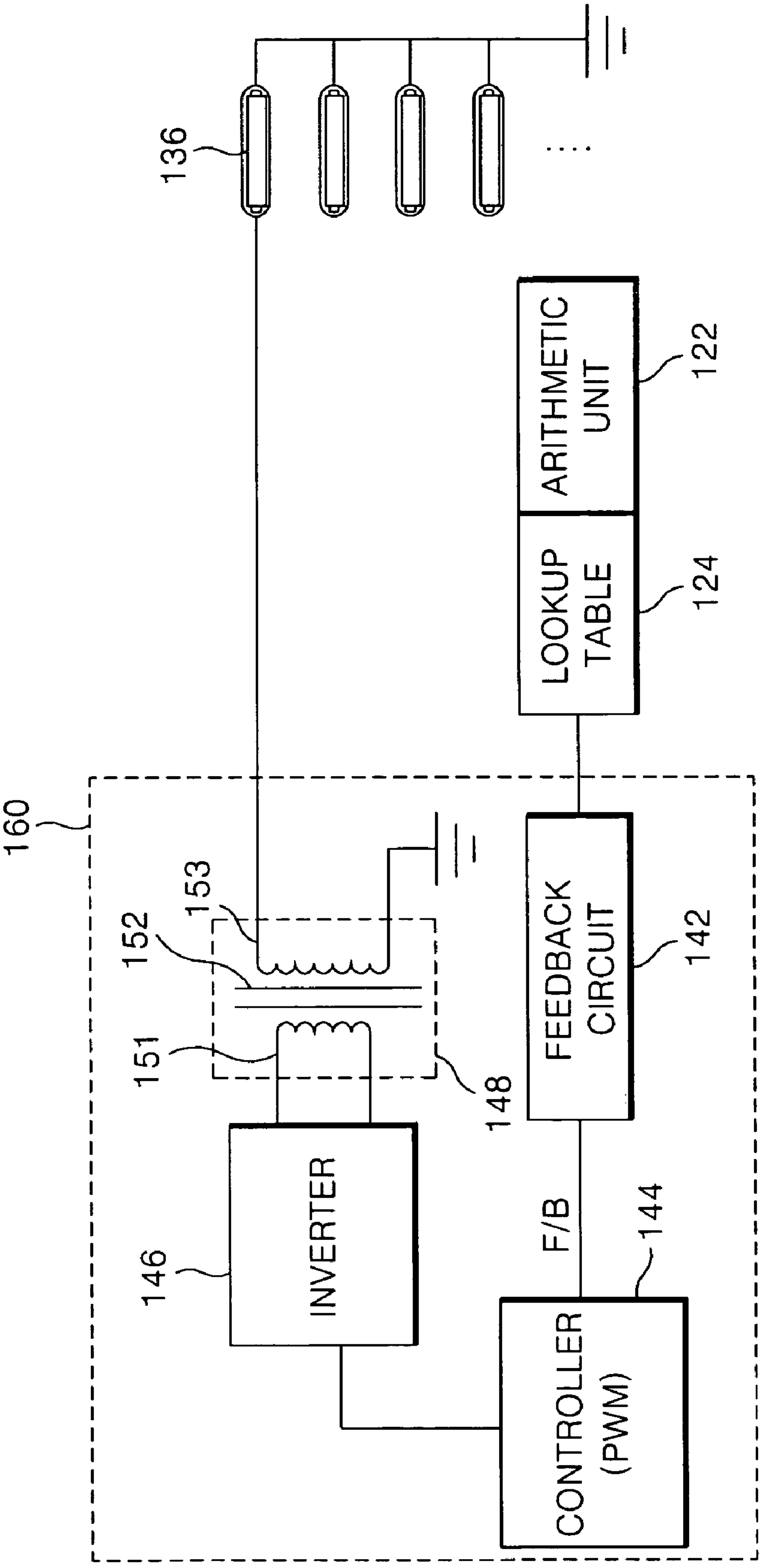
FIG. 10 is a diagram another luminance control apparatus according to the first embodiment of the present invention.

In either embodiment shown in FIG. 8 or FIG. 10, the pulse generated in accordance with the pulse width and/or duty ratio converted from the PWM controller 144 controls the switch of the inverter 146 to change the tube current generated from the transformer 148 corresponding thereto and supplied to the lamp 136.

According to this method, assuming that in the average value of each area of FIG. 5, the average peak value of the "A" area is 100, the average peak value of the "B" area is 300, the average peak value of the "C" area is 100, the average peak value of the "D" area is 500 and the minimum and maximum range of the average value between the areas is 0 to 1000, the duty ratio of the pulse generated from the PWM controller 144 has a lamp duty ratio in the "A" area of 10%, a lamp duty ratio in the "B" area of 30%, a lamp duty ratio in the "C" area of 10% and a lamp duty ratio in the "D" area of 50%. The change of the duty ratio changes the tube current flowing in each of the lamps 136, thereby controlling the brightness. The same effect may be obtained by use of the change of the amplitude of the pulse as well as the duty ratio of the pulse. Further, the arithmetic unit 122 and the lookup table 124 may be manufactured inside the lamp driver 160 as the user desires.

The luminance control apparatus of the liquid crystal display device according to the first embodiment of the present invention divides the liquid crystal display panel 102 into four blocks to control the backlight in accordance with the brightness of each block, thereby achieving the brightness change. However, this method has the backlight controlled in accordance with the average brightness of the block even in case that there is an image of which the peak brightness is highlighted in the specific block among the four blocks, thus the peak brightness cannot be emphasized. Accordingly, the luminance control method of the liquid crystal display device according to the second embodiment of the present invention has the same components as the liquid crystal display device according to the first embodiment of the present invention except that the liquid crystal display panel is further divided into more division areas. As the components are the same, the drawings for this embodiment are omitted and the same reference numerals as those in the first embodiment of the present invention are used.

Figure 11:
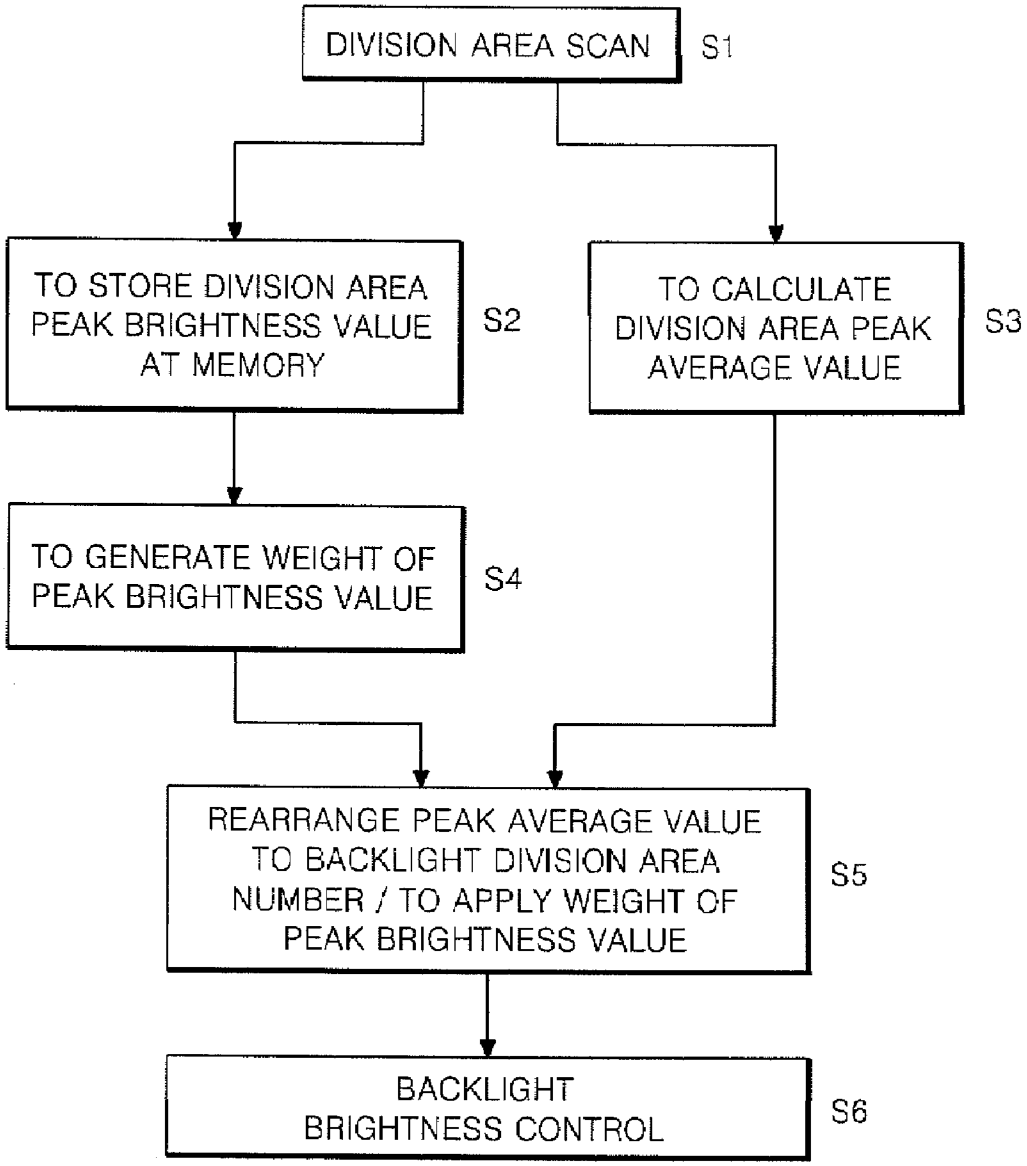
FIG. 11 is a flow chart representing a luminance control sequence according to a second embodiment of the present invention.

FIG. 11 is a flow chart representing a luminance control method of a liquid crystal display device according to the second embodiment of the present invention. The liquid crystal display device according to the second embodiment of the present invention, when compared with the liquid crystal display device according to the first embodiment of the present invention, divides the liquid crystal display panel 102 into the further-divided small division areas, and the lookup table 124 generates a control signal corresponding to the peak brightness value of the average peak value of the small division areas.

Referring to FIG. 11, the luminance control method of the liquid crystal display device according to the second embodiment of the present invention divides the liquid crystal display panel 102 into small areas, e.g., division into 8~100 areas, and scans the image of the small division areas using the scan part 121 (S1). The number of divisions of the liquid crystal display panel 102 is larger than the division number of the backlight 104.

Next, the luminance control method of the liquid crystal display device according to the second embodiment of the present invention detects the peak brightness value of each small division area, then stores the maximum peak brightness value of the small division area (S2) and calculates the average value of the peak brightness value using the calculating part 123 (S3). The average value calculation of the peak brightness value of the small division area is performed in the same way as the calculation in the arithmetic unit 122 according to the first embodiment of the present invention. A weight for each peak brightness value is then generated (S4).

Figure 12:
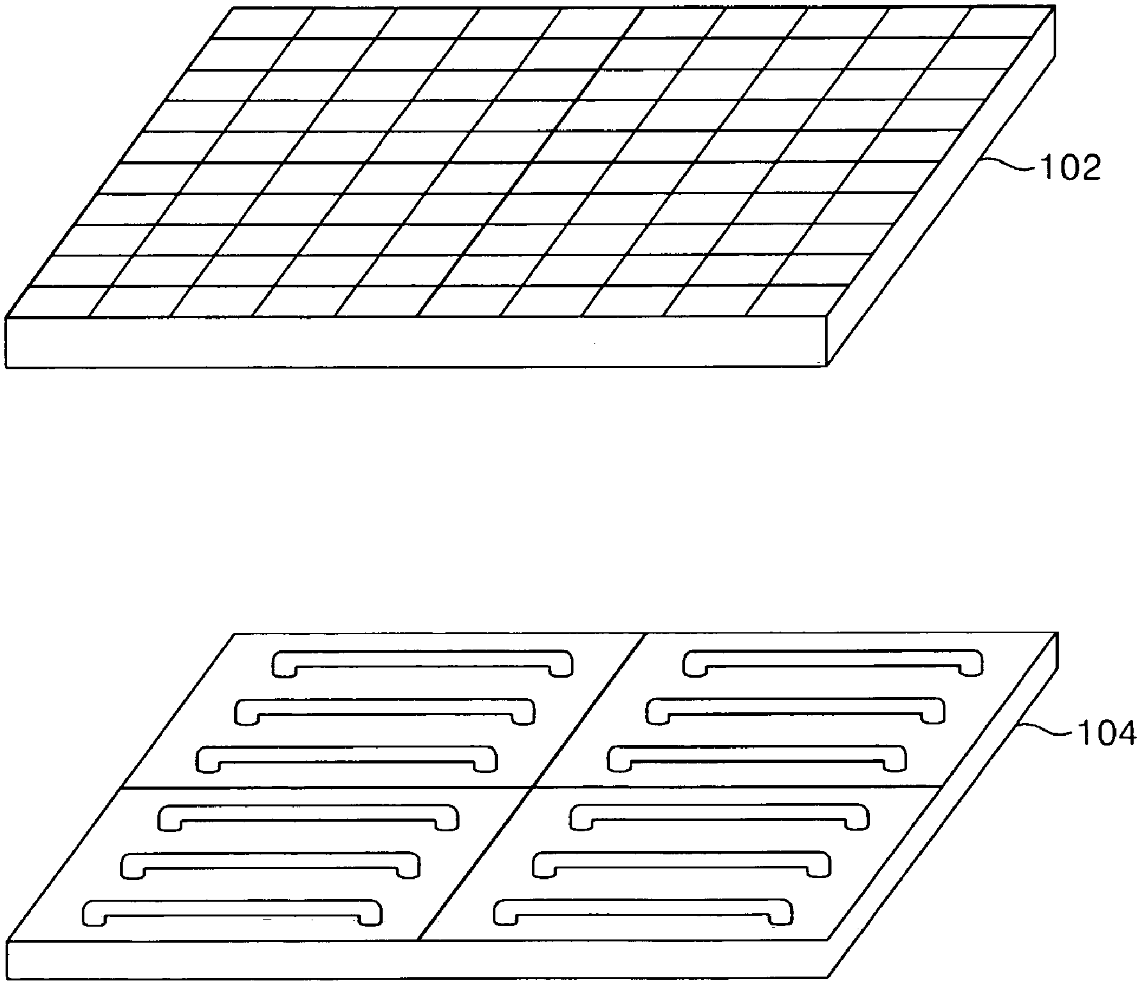
FIG. 12 is a diagram representing a division area of a liquid crystal display panel and a division area of a backlight according to a luminance control method of FIG. 11.

The small division area is then re-arranged into a plurality of group divisions (S5) which is compared with the division area of the backlight 104. For instance, as shown in FIG. 12, if 100 small division areas are present and the backlight 104 is driven by four divisions, each division driving of the backlight represents the average brightness of the 25 small division areas. Or if 1000 small division areas are present, the backlight 104 is driven by 100 divisions, each division driving of the backlight 104 represents the average brightness of the 10 small division areas. The weight of the maximum peak brightness value is applied to each backlight division area. Accordingly, the weight of the maximum peak brightness value is added to the area having the maximum peak brightness value among the backlight division areas. The weight may be decided experimentally in accordance with each image. For example, the weight of an image darker than its surroundings may be set to be low and the weight of an image brighter than its surroundings might be set to be high.

Lastly, the brightness of the backlight 104 is controlled in accordance with the weight of the maximum peak brightness value and the average peak value of the re-arranged division area (S6).

The luminance control method of the liquid crystal display device according to the second embodiment of the present invention driven in this way analyzes the whole image of the small division area, and detects the peak brightness value of the small division area and calculates the average of the detected peak brightness value. The small division area is divided and re-arranged into a plurality of groups to be applied to the peak brightness value and the maximum peak brightness value, thereby enabling to control the backlight 104 to have the brightness closer to the real image.

As described above, the luminance control apparatus and method of the liquid crystal display device according to the embodiment of the present invention changes the tube current flowing in the lamp that irradiates each division area of the liquid crystal display panel with light. Accordingly, movies and images with high brightness differences may be more suitably expressed than using the method of driving the lamps of the whole screen of the prior art. In other words, the lamp current value of the division area is determined by the average value of the peak value of the video pixels to increase the brightness of the lamp in the area where there are more bright images and to decrease the brightness in the area where there are more dark images, thereby realizing a vivid screen. Further, each lamp is dividedly driven, thereby a reduction in its power consumption. Further, the luminance control apparatus and method of the liquid crystal display device according to the embodiment of the present invention, after dividing the whole liquid crystal display panel into small areas, analyzes each small division area to control the backlight brightness, thereby displaying an image that is closer to the real image.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A luminance control apparatus comprising:

a liquid crystal display panel divided into a first number of division areas;

a plurality of lamps divided into and driven using a second number of areas smaller than the first number of division areas;

an arithmetic unit that extracts a peak value of a gray level of each pixel of the division area, and calculates a maximum peak brightness value and an average value in the division area; and a lamp driver that controls a pulse for supplying to the lamp in accordance with the average value and the maximum peak brightness value, wherein the lamp driver controls a pulse duty ratio of the pulse in accordance with the average value and the maximum peak brightness value, and wherein for each of the second number of areas, the pulse duty ratio is a ratio of the average value of each of the second number of areas to a total of the average values of all of the second number of areas.

2. The luminance control apparatus according to claim 1, wherein each pixel contains sub-pixels of different colors and the arithmetic unit extracts a peak value of each sub-pixel.

3. The luminance control apparatus according to claim 2, wherein the sub-pixels comprise a red sub-pixel, a green sub-pixel and a blue sub-pixel.

4. The luminance control apparatus according to claim 2, wherein the arithmetic unit includes:

a scan part that detects video pixels of the division area; and a calculating part that calculates the maximum peak brightness value and the average value of the video pixels.

5. The luminance control apparatus according to claim 1, further comprising:

a lookup table arranged between the arithmetic unit and the lamp driver that maps the maximum peak brightness value and the average value of the arithmetic unit to a control signal corresponding to an image signal.

6. The luminance control apparatus according to claim 1, wherein the lamp driver includes:

an inverter circuit that supplies an AC voltage to the lamp; and a pulse width modulator connected to the inverter that controls a signal generated from the inverter circuit in accordance with the average value of the arithmetic unit.

7. The luminance control apparatus according to claim 1, wherein the arithmetic unit is integrated with the lamp driver.

8. A luminance control method comprising:

irradiating a liquid crystal display panel having a first number of division areas with light from a plurality of lamps dividedly driven into a second number which is smaller than the first number;

calculating a maximum peak brightness value and an average peak value of each of video pixels generated by designated areas of the liquid crystal display panel;

re-arranging a division area of the liquid crystal display panel to correspond to each of lamp division areas; and controlling a pulse for supplying to the lamp to irradiate the liquid crystal display panel with light in accordance with the maximum peak brightness value and the average peak values, wherein a pulse duty ratio of the pulse in accordance with the average peak value and the maximum peak brightness value is controlled, and wherein for each of the second number of areas, the pulse duty ratio is a ratio of the average peak value of each of the second number of areas to a total of the average peak values of all of the second number of areas.

9. The luminance control method according to claim 8, wherein calculating the maximum peak brightness value and the average peak value of the video pixels includes:

scanning video data of each designated area of the liquid crystal display panel;

calculating peak values among pixel values of each data among each of the scanned video data; and calculating the maximum peak brightness value and the average peak value of the peak values of each of the video data.

10. The luminance control method according to claim 8, wherein controlling the lamps includes:

controlling at least one of a pulse duty ratio and a pulse amplitude of a pulse in accordance with the maximum peak brightness value and the average peak value; and controlling a current supplied to the lamp in accordance with at least one of the converted pulse duty ratio and pulse amplitude.

11. A luminance control apparatus comprising:

a display panel having a plurality of pixels, the pixels divided into sets of pixels;

a plurality of lamps supplying light to the display panel, each set of pixels associated with a lamp; and a control circuit that, for each set of pixels, determines a plurality of characteristics including at least two of: a peak value of a gray level of each pixel in the set of pixels, a maximum peak value of the gray levels in the set of pixels, an average peak value of the gray levels in the set of pixels and an average value of the gray levels in the set of pixels, and controls a pulse for supplying to the lamp associated with the set of pixels dependent on the plurality of characteristics, wherein the control circuit controls a pulse duty ratio of the pulse in accordance with the plurality of characteristics, and wherein for each set of pixels, the pulse duty ratio is a ratio of the average peak value of the set of pixels to a total of the average peak values of all of the sets of pixels.

12. The luminance control apparatus according to claim 11, wherein each set of pixels is associated with more than one lamp.

13. The luminance control apparatus according to claim 11, wherein each pixel comprises a plurality of sub-pixels of different colors, each sub-pixel having a peak value used to determine the plurality of characteristics.

14. The luminance control apparatus according to claim 11, wherein the control circuit comprises:

a scan part; and a calculating part that calculates at least some of the plurality of characteristics.

15. The luminance control apparatus according to claim 11, wherein the control circuit comprises a lookup table that maps the plurality of characteristics to a control signal corresponding to an image signal.

16. The luminance control apparatus according to claim 11, wherein the control circuit comprises:

an inverter circuit that, for each lamp associated with the set of pixels, supplies an AC voltage to the lamp; and a pulse width modulator connected to the inverter that controls a signal generated from the inverter circuit in accordance with the determined average value.

17. The luminance control apparatus according to claim 11, wherein each lamp is associated with more than one set of pixels.

18. The luminance control apparatus according to claim 17, wherein the control circuit comprises a memory in which the maximum peak value of each set of pixels is stored, and the control circuit generates a weight for each peak brightness value and controls each lamp dependent on the weight and an average value of a plurality of the sets of pixels.

19. The luminance control apparatus according to claim 18, wherein each plurality of the sets of pixels is associated with a different lamp.

* * * * *

UNITED STATES PATENT AND TRADEMARK OFFICE

CERTIFICATE OF CORRECTION

PATENT NO. : 7,609,248 B2
APPLICATION NO. : 11/149876
DATED : October 27, 2009
INVENTOR(S) : Hee Jung Hong et al.

It is certified that error appears in the above-identified patent and that said Letters Patent is hereby corrected as shown below:

In the Claims

In column 9, claim 8, line 42, after "peak" replace "values," with --value,--.

Signed and Sealed this

Eighth Day of June, 2010

David J. Kappos
*Director of the United States Patent and Trademark Office*

UNITED STATES PATENT AND TRADEMARK OFFICE

CERTIFICATE OF CORRECTION

PATENT NO. : 7,609,248 B2
APPLICATION NO. : 11/149876
DATED : October 27, 2009
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Twelfth Day of October, 2010

David J. Kappos

*Director of the United States Patent and Trademark Office*